Feb. 6, 1934.                J. S. BENNETT                1,946,125
           LINER BLOCK FOR TUBULAR FLUID COOLED WALLS
                Filed June 7, 1930         6 Sheets-Sheet 1
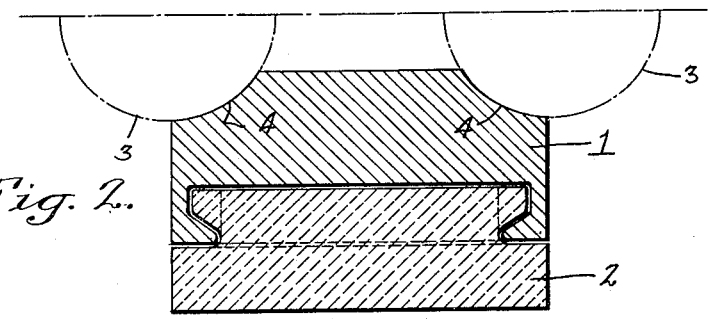
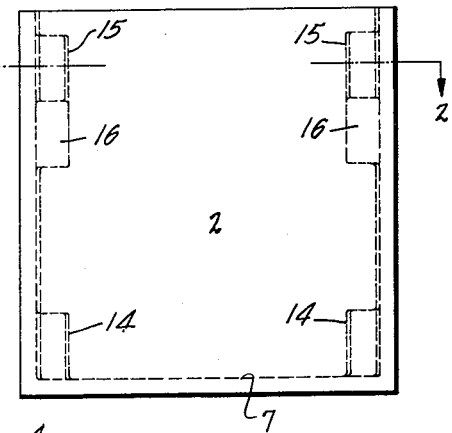
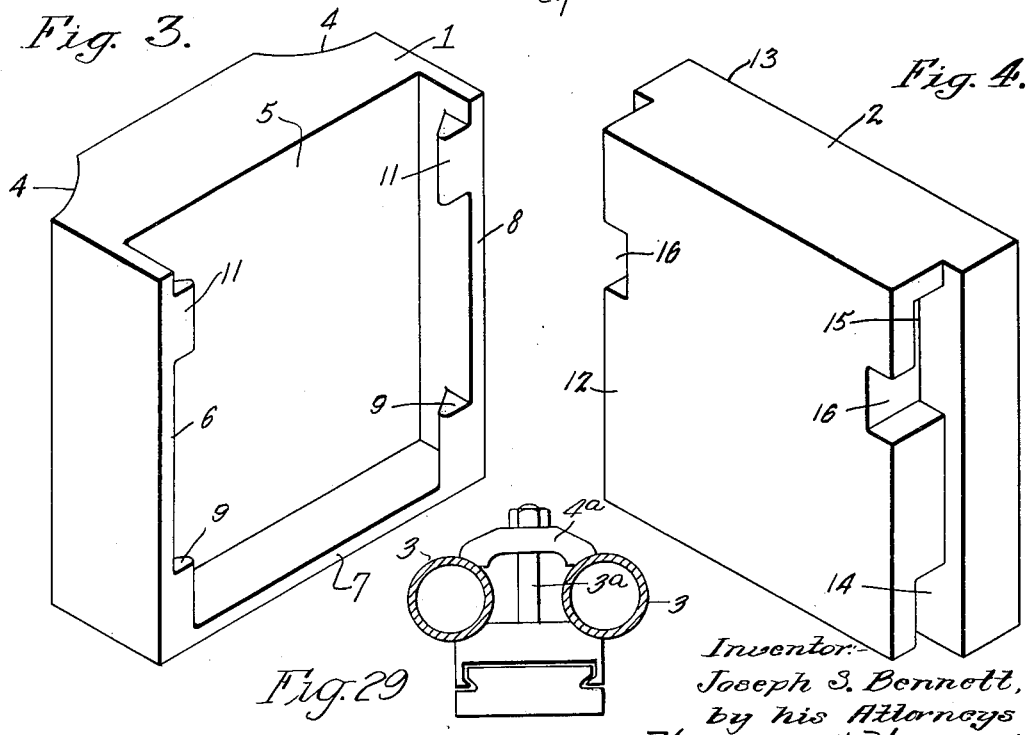
Inventor:
Joseph S. Bennett,
by his Attorneys
Howson & Howson Feb. 6, 1934. J. S. BENNETT 1,946,125
LINER BLOCK FOR TUBULAR FLUID COOLED WALLS
Filed June 7, 1930  6 Sheets-Sheet 2
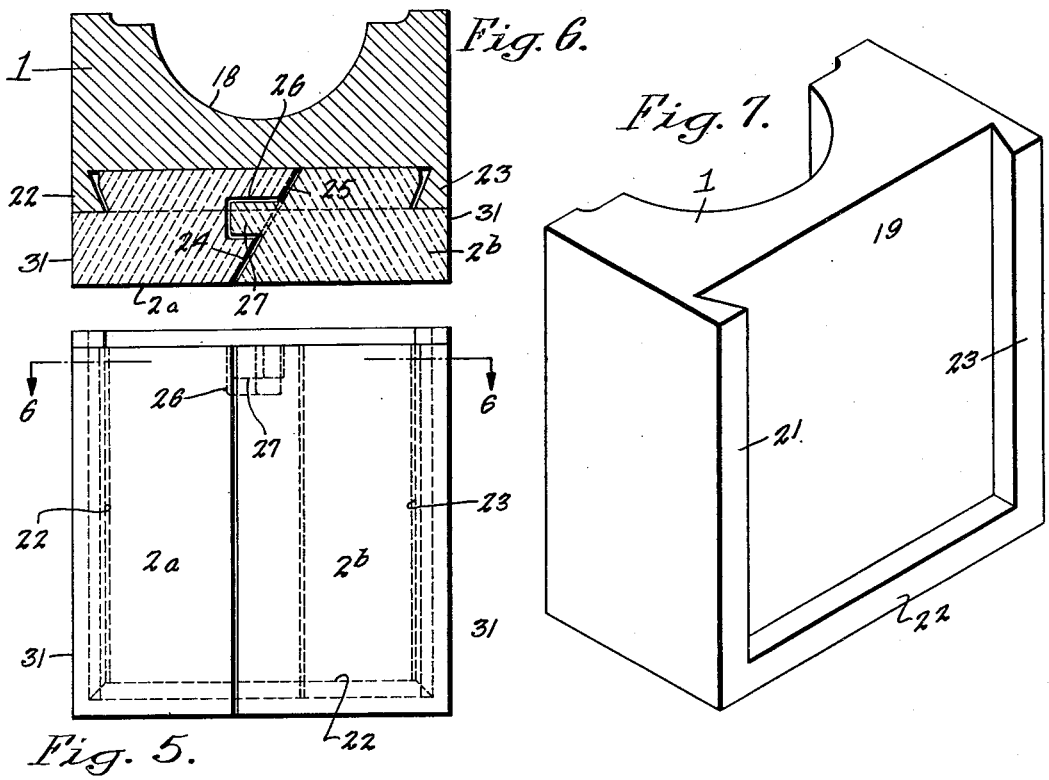
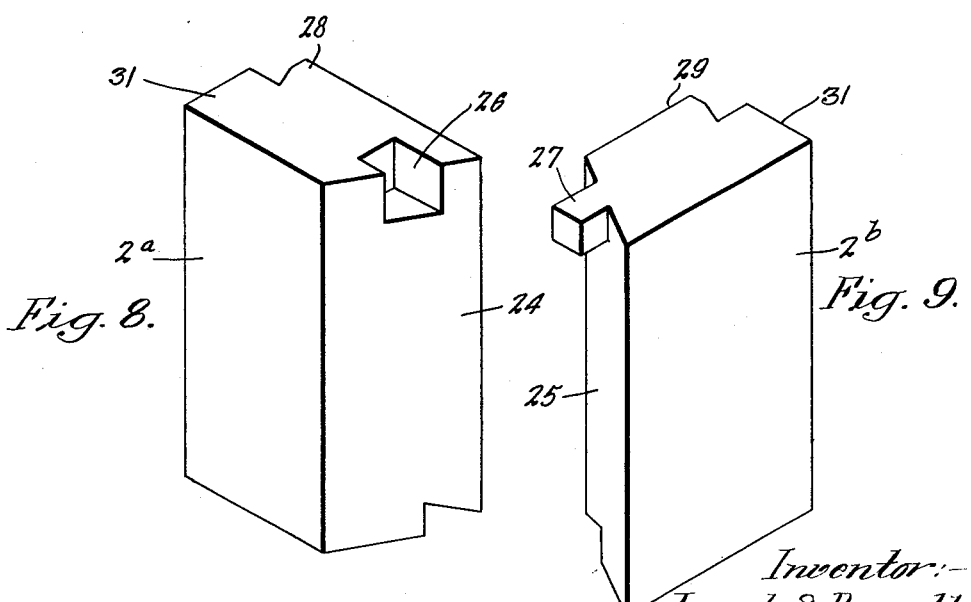
Inventor:-
Joseph S. Bennett,
by his Attorneys
Howson & Howson Feb. 6, 1934.   J. S. BENNETT   1,946,125
LINER BLOCK FOR TUBULAR FLUID COOLED WALLS
Filed June 7, 1930   6 Sheets-Sheet 3

Inventor:—
Joseph S. Bennett,
by his Attorneys
Howson & Howson

Feb. 6, 1934.   J. S. BENNETT   1,946,125
LINER BLOCK FOR TUBULAR FLUID COOLED WALLS
Filed June 7, 1930   6 Sheets-Sheet 4

Inventor:—
Joseph S. Bennett,
by his Attorneys
Howson & Howson

Feb. 6, 1934.  J. S. BENNETT  1,946,125
LINER BLOCK FOR TUBULAR FLUID COOLED WALLS
Filed June 7, 1930  6 Sheets-Sheet 5
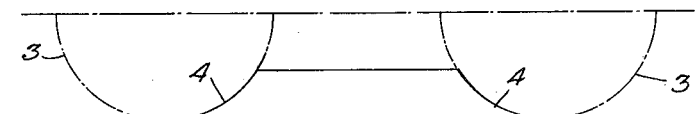
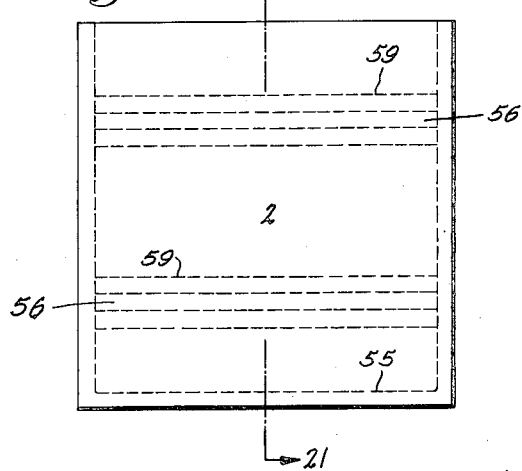
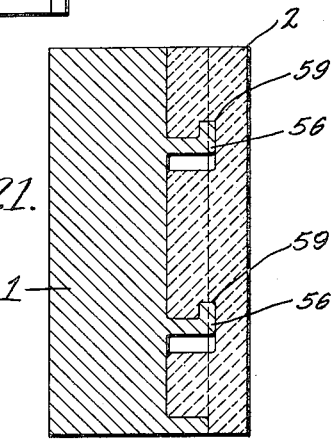
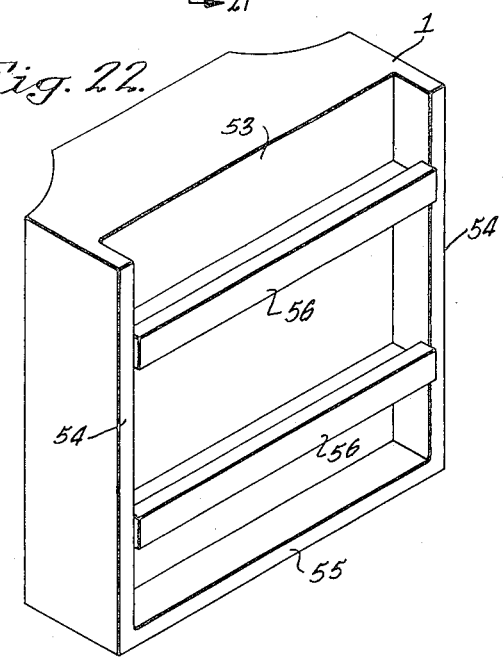
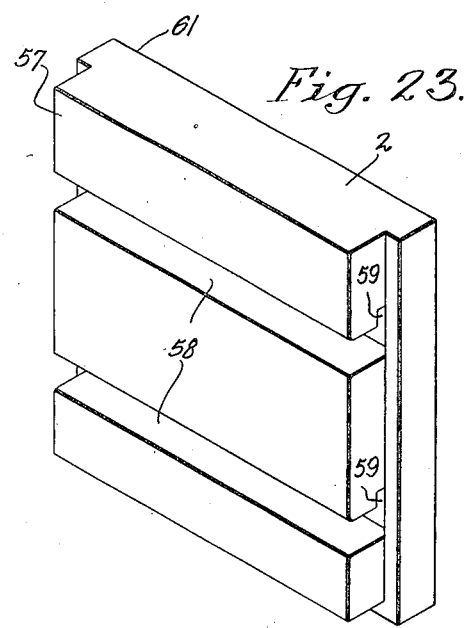
Inventor:
Joseph S. Bennett,
by his Attorneys
Howson & Howson Feb. 6, 1934. J. S. BENNETT 1,946,125
LINER BLOCK FOR TUBULAR FLUID COOLED WALLS
Filed June 7, 1930 6 Sheets-Sheet 6
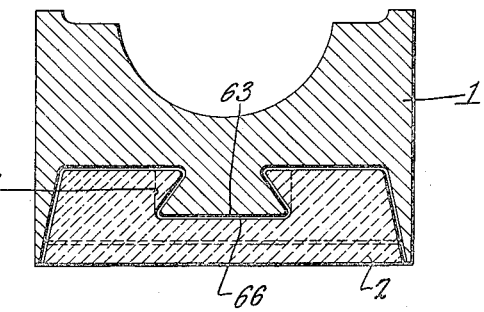
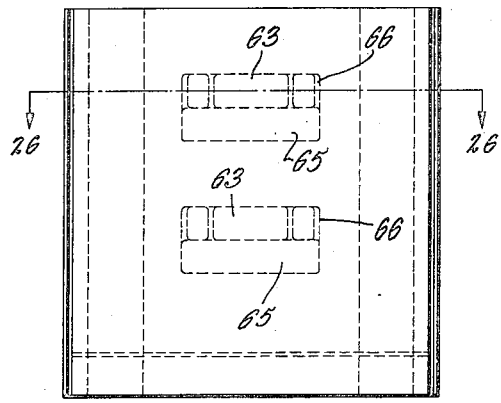
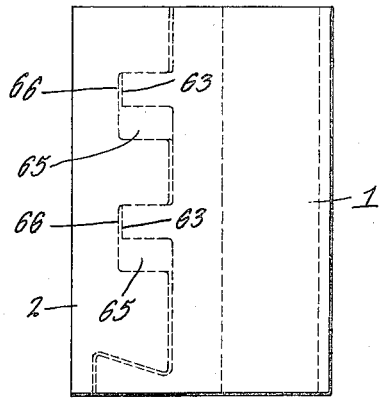
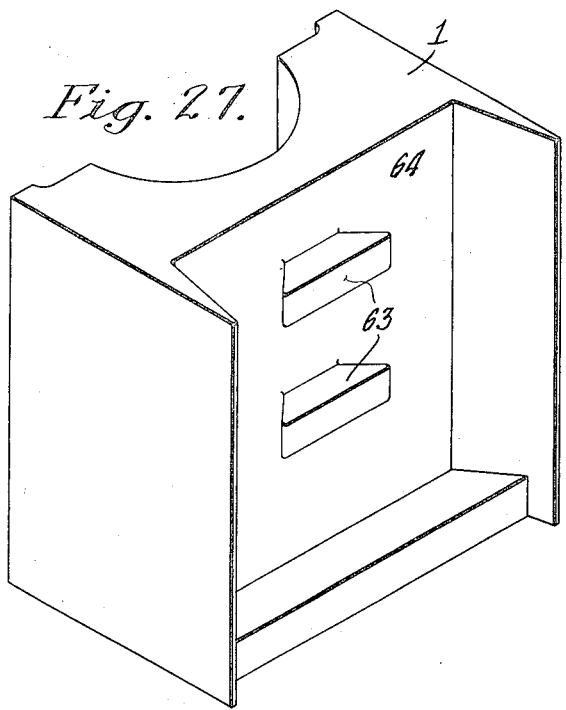
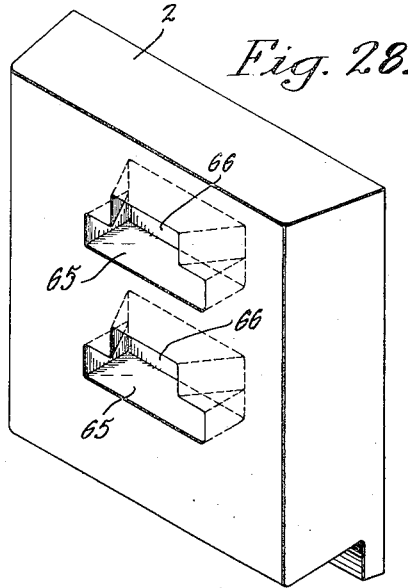
Inventor:-
Joseph S. Bennett,
by his Attorneys
Howson & Howson Patented Feb. 6, 1934

1,946,125

UNITED STATES PATENT OFFICE 1,946,125

LINER BLOCK FOR TUBULAR FLUID-COOLED WALLS

Joseph S. Bennett, Merion, Pa., assignor to American Engineering Company, Philadelphia, Pa., a corporation of Pennsylvania Application June 7, 1930. Serial No. 459,752

6 Claims. (Cl. 110—1)

This invention relates to improvements in tubular fluid cooled walls, such for example as the tubular water walls of furnaces and the like. These walls commonly comprise a bank of tubes through which a cooling medium, usually water, is circulated, together with a lining structure forming the effective wall surface and composed of a plurality of blocks of refractory and heat-conducting material, which blocks are supported in direct and intimate contact with the said tubes whereby heat is continuously withdrawn from the blocks by the cooling medium circulated through the tubes.

An object of the present invention is to provide a novel and improved liner block of the stated type, said block being characterized by an exceptional ability to withstand the high temperatures to which it is exposed, also, the block, by reason of its novel construction, being highly efficient for the intended purpose.

Another object of the invention is to provide a liner block having improved heat-insulating properties whereby the heat transfer to the associated tubes is controlled and regulated to an extent largely preventing formation of scale in localized portions of the tubes due to the combined effect of impurities in the feed water and excessive heat conditions.

Another object of the invention is to provide added protection to the blocks located in certain portions of the water wall which are subjected to unusual service conditions under which blocks of prior types would rapidly deteriorate.

Still another object of the invention is to provide a wall structure permitting maintenance of higher furnace temperatures than heretofore has been practicable, this being especially desirable where powdered fuel is employed for insuring proper ignition.

Another object of the invention is to provide a block of the stated type which shall comprise a body member adapted to be secured in contact with the said tubes, together with a refractory facing shielding the body member from direct exposure to the high temperatures, said facing preferably being in the form of a readily detachable and replaceable element.

To this latter end, a further object of the invention is to provide a novel and improved means for supporting on a body or base block a detachable facing of the stated character.

Still another object of the invention is to provide a block of the stated character of exceptionally high efficiency as well as great durability by reason of a novel structural form affording a highly refractory facing and a backing or body member of relatively high heat conductive characteristics adapted for direct contact with the tubes of the cooling system.

In general the object of the invention is to provide a protective block of the stated character which shall have a high efficiency in the function for which it is intended, and great durability, and which by reason of provision for replacing the portions which are directly exposed to the high temperatures, shall make possible where desired, a substantially permanent installation of cooling tubes and liner.

The invention further resides in certain novel structural arrangements and details hereinafter set forth and illustrated in the attached drawings, in which:

Figure 1 is a front elevational view of a protective block made in accordance with my invention;

Fig. 2 is a section on the line 2—2 Fig. 1;

Figs. 3 and 4 are detached views in perspective of the base block and facing element respectively;

Fig. 5 is a front elevational view of a protective block constituting another embodiment of my invention;

Fig. 6 is a section on the line 6—6, Fig. 5;

Fig. 7 is a view in perspective of the base or body block;

Figs. 8 and 9 are views in perspective of the two parts of the facing element respectively;

Fig. 19 is a front elevational view of still another form of protective block falling within the scope of the invention;

Fig. 20 is a plan view of the block;

Fig. 21 is a section on the line 21—21, Fig. 19;

Figs. 22 and 23 are detached perspective views of the base block and the detachable facing therefor;

Fig. 24 is a front elevational view of a protective block illustrating a further modification within the scope of the invention;

Fig. 25 is a side elevational view of the block shown in Fig. 24;

Fig. 26 is a section on the line 26—26, Fig. 24;

Figs. 27 and 28 are, respectively, detached perspective views of the body or base block illustrated in Figs. 24 to 26, inclusive, and the facing element therefor;

Fig. 29 is a fragmentary sectional view illustrating one method of securing liner blocks of the type shown in Figs. 1 to 4 and 19 to 23, inclusive, to the tubular elements.

Figure 11:
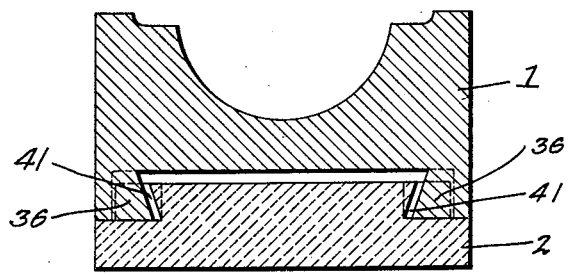
Fig. 11 is a section on the line 11—11, Fig. 10.

As illustrated in the drawings, a block made in accordance with the present invention comprises a body or base member 1, made preferably of cast iron or other structurally strong refractory material of relatively high heat conductivity, and a facing 2 therefor preferably of high refractory material, such as fireclay, carborundum or ceramic substance, having a sufficiently high conductivity to permit an efficient withdrawal of heat through the medium of the base member 1 and the tubular cooling system 3 with which in assembly the said base is in contact. Preferably as illustrated in the various drawings, the facing 2 is in the form of a detachable element or elements which effectively shields or shield the base member 1 from direct exposure to the higher temperatures. In a block of this character having a detachable protective facing, it is desirable that the facing itself shall be highly refractory and capable of withstanding the high temperatures to which it is directly exposed, whereby the chief characteristic of the body member 1, aside from an inherent structural strength, shall be a relatively high heat conductivity whereby an efficient heat-transfer connection is established between the refractory facing and the tubular cooling system. The materials of which these parts are made may vary widely, however, in accordance with the particular requirements. In some instances for example, it may be desirable to form both the base member 1 and the facing 2 of cast iron or other suitable metal although for most purposes highly satisfactory results will be obtained with a body member of cast iron and a liner 2 of carborundum or ceramic material. In view of the fact that in each of the illustrated embodiments of my invention the block comprises a body or base member and a detachable facing, these elements as well as the tubular elements of the cooling system are designated in each instance by the same reference numerals.

With particular reference to Figs. 1 to 4, inclusive, it will be noted that the base member 1 is formed to engage two of the parallel tubes 3 of the tubular cooling system, the said member being formed with two recesses 4, 4 corresponding with the surface curvature of the tubes 3 whereby the block 1 is brought into intimate engagement with the tubes over a substantial surface area. One means by which the body member 1 may be secured in engagement with the tubes 3 is shown in Fig. 29 and comprises a stud 3a and clamp 4a which cooperate in obvious manner for the stated purpose.

As best shown in Fig. 3, the body member 1 is formed, in that face opposite the recesses 4, with a substantially rectangular recess 5, this recess embracing substantially the entire area of that face of the member and being bounded on three sides by narrow marginal flanges 6, 7 and 8. At the top, the recess 5 extends to the upper surface of the body-member. At each lower corner and adjacent each of the upper corners, the member 1 is provided with outwardly tapering lugs 9, 9 and 11, 11, these lugs projecting from the marginal flanges 6 and 8 across the front of the recess 5 and having outer surfaces which are coplanar with the outer edge surfaces of the said terminal flanges 6, 7 and 8.

The facing element 2, as shown in perspective in Fig. 4, is formed with a substantially rectangular rear portion 12 corresponding substantially in dimensions with the recess 5 of the body member 1 and adapted to occupy and substantially fill said recess after the manner shown in Fig. 2. The liner or facing 2 also comprises a forward portion 13 which corresponds in outer dimensions substantially with the corresponding dimensions of the base 1 whereby when the facing element is assembled with the body member, the element substantially completely covers the forward face thereof, see Fig. 1.

The lugs 11 constitute the means for locking the element 2 in the body member. To this end, the rear portion 12 of the element 2 is provided at each side edge with a pair of recesses 14 and 15, which in assembly, as illustrated in Figs. 1 and 2, are occupied by the lugs 9 and 11 respectively, whereby the said facing element 2 is interlocked with the body member at points adjacent the top and bottom and at both sides with the said base block. In order to permit insertion of the facing element 2 in the recess 5, the recesses 14 and 15 are intersected at their bottoms by rearwardly extending channels 16 which in vertical and horizontal dimensions correspond with the lugs 11, the distance between the bottoms of the recesses 16 and the bottom of the rear portion 12 of the block being substantially the same as the distance between the bottoms of the lugs 11 and the tops of the lugs 9. This permits insertion of the facing element 2 in the recess 5, the bottom of the rear portion 12 of the facing element passing over the tops of the lugs 9 and the lugs 11 passing through the recesses 16. Following complete insertion of the facing element in this manner, the facing is allowed to drop downwardly so that the lugs 9 engage in the recesses 14 while the lugs 11 pass into the recesses 15. The facing element is thus locked in position in the recess and may be removed only by elevation sufficient to clear the lugs from the recesses which they occupy, and subsequent forward withdrawal of the element from the recess 5.

Figure 30:
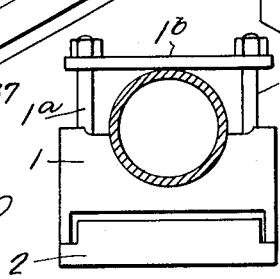
Fig. 30 is a corresponding view illustrating the means for attaching blocks of the type shown in Figs. 5 to 18 and 24 to 28, inclusive.
Figure 13:
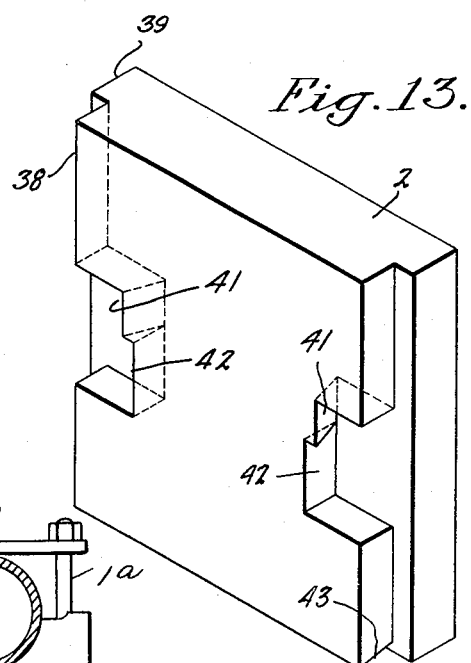
Fig. 13 is a view in perspective of the detached facing element for the block shown in Figs. 10, 11 and 12.
Figure 15:
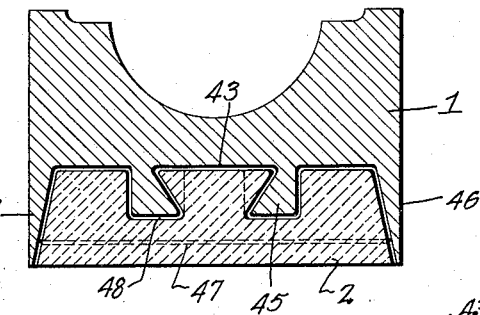
Fig. 15 is a section on the line 15—15, Fig. 14.
Figure 14:
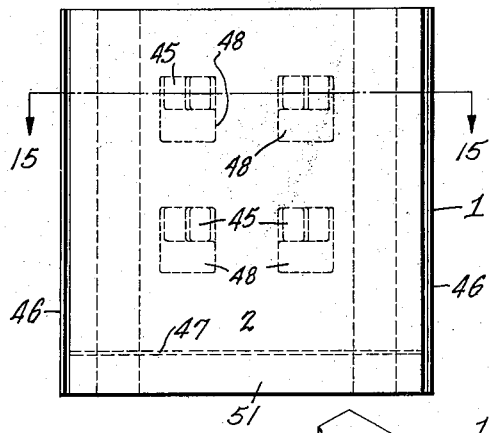
Fig. 14 is a front elevational view of a facing block constituting a still further embodiment of my invention.

In that embodiment of my invention shown in Figs. 5 to 9, inclusive, the body or base member 1 of the protective block is formed to engage but one of the tubular elements of the cooling system, and to this end, the said body member 1 is provided with a single semicircular recess 18 extending continuously in the rear wall of the block from the top surface to the bottom. By means of this recess, the base blocks 1 are brought into intimate contact with the tubular elements over a surface area embracing substantially one-half of the circumference of the tube, studs 1a, 1a cooperating with a clamp 1b to hold the blocks to the tubes, as shown in Fig. 30. The base member 1 in this instance is provided in its forward face with a recess 19 bounded at the sides and bottom by narrow marginal flanges 21, 22 and 150

23, the inner faces of these flanges being undercut or mitred to form in effect a dovetail. As shown in Fig. 7, the recess 19 terminates in the upper surface of the base block. In this instance, a liner element is provided in two parts designated 2a and 2b respectively, these parts having diagonal abutting faces 24 and 25 respectively, the face 24 being provided at the top edge with a recess 26 for reception of a correspondingly formed lug projecting from the upper edge of the face 25 of the part 2b. The parts 2a and 2b of the facing element are also provided respectively with rear portions 28 and 29 which are adapted to occupy positions within the recess 19 of the base member 1 and which when the parts 2a and 2b are assembled with the faces 24 and 25 in abutment and with the lug 27 inserted in the recess 26 combine to form a rear member whose side and bottom edges are mitred in correspondence with the mitred inner faces of the terminal flanges 21, 22 and 23 and which is dimensioned to substantially fill the recess 19, as shown in Figs. 5 and 6. The parts 2a and 2b of the facing element are each provided with a forward portion 31 which at the side and bottom edges extend beyond the sides of the rear portion 28 and which in assembly form a forward portion which is dimensionally the same as the corresponding dimensions of the base member 1, so that the forward face of the latter is substantially covered and protected by the facing element. The facing element may be inserted in the recess 19 by sliding the assembled element downwardly into the recess 19 from the upper end, the lug 27 and the recess 26 interlocking the parts 2a and 2b at the top and the entire facing element being held by the mitred inner faces of the terminal flanges. Either one or both of the parts of the facing element may be withdrawn readily for replacement purposes.

Figure 10:
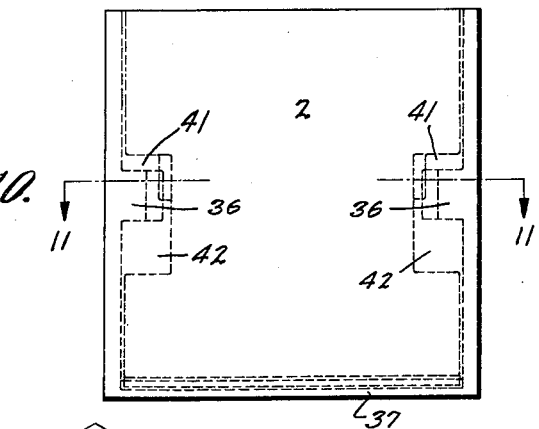
Fig. 10 is a front elevational view of a facing block constituting another modification within the scope of the invention.
Figure 12:
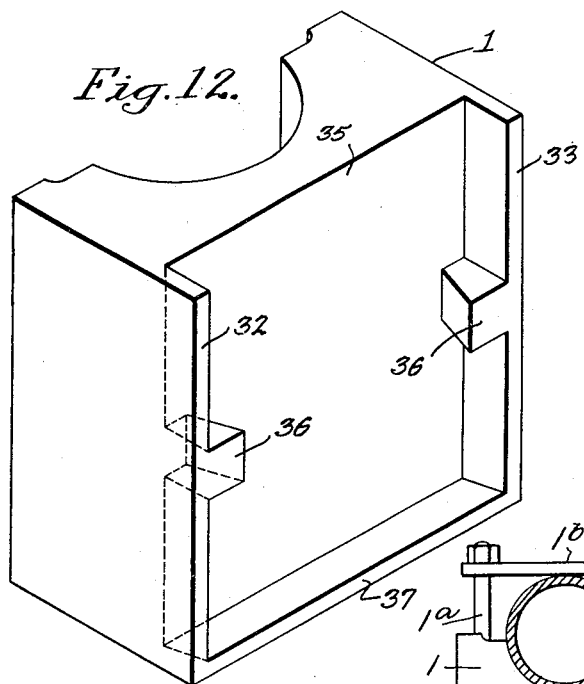
Fig. 12 is a view in perspective of the base or body member of the block with the detachable facing removed.

In the embodiment shown in Figs. 10 to 13, inclusive, the base member in general form is similar to that shown in Figs. 6 and 7, with the exception that in this instance the inner faces of the side terminal flanges 32 and 33 of the recess 35 of the base member are normal to the forward face of said member and are provided in each instance with an inwardly projecting lug 36, which lugs are beveled or undercut, as shown in Fig. 11. Also the inner face of the bottom of the terminal flange 37 is undercut or mitred after the manner of the flange 22 of the embodiment shown in Fig. 7. The facing element 2 comprises the usual rear portion 38 adapted to fit the recess 35 of the base member and a forward portion 39 which in assembly projects over the forward edges of the flanges 32, 33 and 37 to form a complete protecting cover for the base member 1. The side edges of the rear portion 38 of the element 2 are provided with recesses 41, the inner side walls of which are beveled in accordance with the formation of the lugs 36, the recesses 41 thereby being adapted to receive the said lugs to lock the facing element 2 in position in the body member 1. In order to permit assembly of the facing element 2 with the body member 1, transverse recesses 42 are provided in the side edges of the rear portion 38, these recesses at the top joining the recesses 41. The recesses 42 are sufficiently deep to permit passage of the lugs 36 into a position where downward movement of the facing element 2 permits the said lugs to enter the recesses 41, the lower beveled edge 43 of the rear portion 38 of the element 2 thereby being brought into engagement with the inner correspondingly beveled face of the bottom terminal flange 37 of the recess 35 whereby the facing element 2 is locked in position in the body member 1 along the bottom edge thereof and also at the sides where the lugs 36 interlock with the recesses 41, all as shown in Fig. 10.

Figure 16:
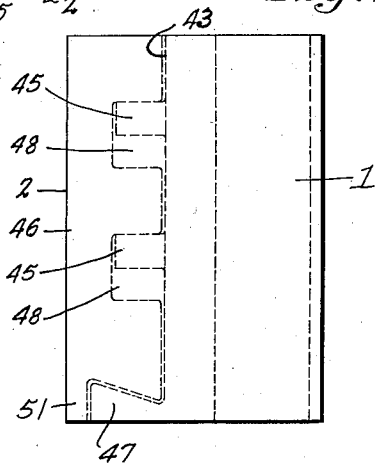
Fig. 16 is a side elevational view of the block shown in Fig. 14.
Figure 17:
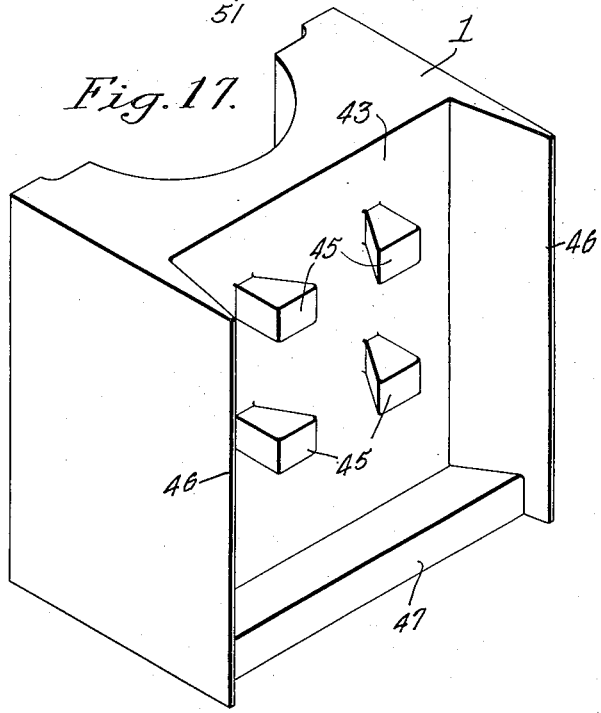
Figs. 17 and 18 are detached views in perspective of the base or body member of the block and the detachable facing.
Figure 18:
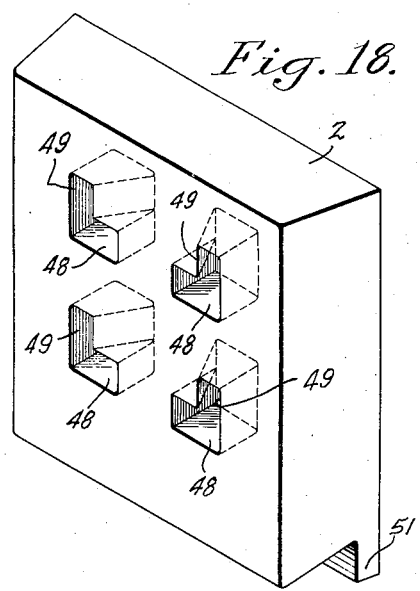

In the embodiment shown in Figs. 14 to 18, inclusive, the recessed forward face of the body member 1 is provided in the inner wall of the recess with a plurality of integral projecting lugs 45, one side of each of these lugs diverging from the opposite wall towards the outer end of the lug. In this instance, the inner faces of the side terminal walls 46 converge outwardly towards the outer faces, while the bottom terminal wall 47 of the recess, which is of lesser breadth than the side walls 46, is inwardly beveled, as most clearly shown in Fig. 16. The facing element 2 is provided on its inner face with recesses 48 formed and positioned to receive the respective lugs 45, the upper parts of the recesses 48 being undercut in one wall in accordance with the form of the lugs 45 whereby when the element 2 is introduced into the recess 43 with the lugs 45 entering the recesses 48 is then slid downwardly, the lugs 45 enter and interlock with the upper portions 49 of the said recesses 48 after the manner illustrated in Fig. 15, to thereby retain the facing element 2 in position in the member 1. In the assembly, as shown in Fig. 16, the bottom beveled edge of the rear portion of the element 2 interlocks with the beveled bottom terminal wall 47 of the recess to create a further interlocking of the facing element in the body member. It will be noted that the side walls of the element 2 are beveled outwardly so as to fit closely the side terminal walls 46 of the recess, while a depending flange 51 at the bottom edge of the element 2 extends downwardly over the front of the bottom terminal wall 47. Normally the narrow forward edges of the terminal walls 46 of the base member 1 are exposed at the forward face of the block, the facing element 2 constituting an effective shield for substantially the entire base member.

The block illustrated in Figs. 19 to 23, inclusive, is constructed, after the manner of the block shown in Figs. 1 to 4, to contact with two of the tubes 3 of the cooling system. The body member 1 is provided in its forward face with a recess 53 for reception of the facing element 2, this recess being bounded by side terminal walls 54—54 and bottom terminal wall 55. The locking means for the facing element consists in the present instance of two transverse flanges 56 of L-shaped cross section, these flanges extending completely across the recess 53 and extending slightly beyond the forward faces of the flanges 54. The rear portion 57 of the facing element 2 is provided with transverse recesses 58—58 which in their outer portions are of a width corresponding to the vertical dimension of the outer ends of the flanges 56, the recesses 58 having at their inner ends upward extensions 59 which in assembly receive the upwardly projecting outer ends of the flanges 56, as shown in Fig. 21, thereby to support and lock the facing element 2 in the body member 1. It will be noted that the inner ends of the recesses 58 with the extensions 59 extend into the forward portion 61 of the element 2 to an extent corresponding to the extension of the flanges 56 beyond the forward edges of the flanges 54. The forward portion 61 of the element 2 overlies the forward faces of the side flanges 54 and bottom flange 55 to afford complete coverage and protection for the base member, 1.

In Figs. 24 to 28, inclusive, a protective block is shown which is similar to the block shown in Figs. 14 to 18, inclusive, this block differing only as to the form and number of the lugs 63 which project from the inner face of the recess 64 in the base member 1 which receives the facing element 2. The recesses 65 in the inner face of the element 2 correspond in form to the lugs 63, which latter are of dovetailed formation, as clearly illustrated. The bottom portions of the recesses 65 are of a width permitting entrance of the lugs 63, while the upper portions 66 of the said recesses are undercut at the sides in accordance with the dovetailed formation of the lugs 63 whereby, after insertion of the facing element 2 into the recess 64, the lugs entering the lower portions of the said recesses, a downward movement of the element 2 in the recess brings the lugs 63 into interlocked engagement with the upper portions 66 of the recesses in obvious manner and as illustrated in Fig. 26.

A wall constructed as described above has certain highly desirable characteristics not heretofore obtainable. It is possible, for example, by utilizing the invention to obtain considerably higher furnace temperatures without damage to the walls or to the cooling system. This is due to the fact that the carborundum or other facing is highly refractory or heat-resistant and also prevents undue transfer of heat to the cooling tubes.

There may be numerous other embodiments within the scope of the invention as defined by the appended claims.

I claim:

1. A liner block for walls comprising a base member and a facing member therefor, one of said members having a recess the opposite sides and one end of which are defined by projecting flanges of said member, the other side of said recess being open, and the other of said members having a projecting element adapted to enter said recess, and said recess and element being provided with oppositely disposed shoulders adapted to interlock to secure said members together, said element being entered in the recess and the shoulders being interlocked by successive relative movements of said members in different directions.

2. A liner block for walls comprising a base member and a facing member therefor, one of said members having a recess the opposite sides and one end of which are defined by projecting flanges of said member, the other side of said recess being open, and the other of said members having a projecting element adapted to occupy said recess, and said recess and element being provided with oppositely disposed shoulders adapted to interlock to secure said members together, said element being entered in the recess by a relative movement of said members in a direction substantially normal to the contiguous faces thereof, and said shoulders being interlocked by a subsequent relative movement of said members in a direction substantially parallel to the planes of said faces.

3. A liner block for walls comprising a base member having a recess, the opposite sides and one end of which are defined by projecting flanges of said member, the other side of said recess being open, a facing member adapted to occupy said recess and insertable therein by a movement substantially normal to the said face, and oppositely disposed shoulders on said members interlocked by a subsequent relative movement of said members in a direction substantially parallel to the plane of the face of said base member for anchoring the facing member in the base member.

4. A liner block comprising a base member having in one face thereof a recess the opposite sides of one end of which are defined by projecting flanges of said member, the other side of said recess being open, an element extending between the side walls of said recess and spaced from the bottom of the latter, and a facing member for said base adapted to occupy said recess and having in its inner face a recess for reception of said element, the last-named recess being offset at its inner end to permit interlocking engagement between the said base element and the facing member preventing displacement of the latter from the base member.

5. A liner block comprising a base member having in one face thereof a recess, the opposite sides and one end of which are defined by projecting flanges of said member, the other side of said recess being open, a facing member adapted to occupy said recess, said facing member having in its inner face a recess terminating in an offset, and an element extending between the walls of said base recess and adapted to enter the recess in said facing member and to occupy said offset whereby said facing member is anchored in the base member.

6. A liner block comprising a base member having a recess in one face thereof, locking elements projecting from the sides of said recess, a facing member adapted to occupy the recess in said base member and having recesses for reception of said locking elements, said last-named recesses being formed in part to interlock with said elements to prevent displacement of the facing member from the base member and having portions permitting access of said elements to the first-named parts of said recesses by an initial movement of said facing member toward the recessed face of said base member and a subsequent movement in a direction substantially parallel to the plane of said face.

JOSEPH S. BENNETT.